(12) United States Patent
Kruglick

(10) Patent No.: US 8,761,290 B2
(45) Date of Patent: Jun. 24, 2014

(54) COGNITIVE RADIO SPECTRUM SENSING VIA CDMA RECEIVER CODING

(75) Inventor: Ezekiel Kruglick, Poway, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 0 days.

(21) Appl. No.: 13/133,942

(22) PCT Filed: Jan. 28, 2011

(86) PCT No.: PCT/US2011/023029
§ 371 (c)(1),
(2), (4) Date: Jun. 9, 2011

(87) PCT Pub. No.: WO2012/102733
PCT Pub. Date: Aug. 2, 2012

(65) Prior Publication Data
US 2013/0336364 A1    Dec. 19, 2013

(51) Int. Cl.
*H04B 7/02* (2006.01)
(52) U.S. Cl.
USPC ........... 375/267; 375/260; 375/259; 375/139; 375/141
(58) Field of Classification Search
USPC .......................................... 375/267, 260, 259
See application file for complete search history.

(56) References Cited

U.S. PATENT DOCUMENTS

| | | | | |
|---|---|---|---|---|
| 5,905,722 | A * | 5/1999 | Kim ............................... | 370/342 |
| 2003/0064729 | A1 * | 4/2003 | Yamashita ..................... | 455/451 |
| 2008/0014880 | A1 * | 1/2008 | Hyon et al. ................. | 455/161.1 |
| 2008/0080604 | A1 | 4/2008 | Hur et al. | |
| 2011/0003590 | A1 * | 1/2011 | Yoon et al. ................. | 455/432.1 |
| 2011/0021167 | A1 | 1/2011 | Shellhammer | |
| 2011/0263208 | A1 * | 10/2011 | Barnawi ..................... | 455/67.11 |

FOREIGN PATENT DOCUMENTS

WO    2010/011796 A2    1/2010

OTHER PUBLICATIONS

Kanke Gao, Stella N. Batalama, Dimitris A. Pados, John D. Matyjas, "Cognitive CDMA Channelization", (invited paper) in *Proceedings Asilomar Conference of Signals, Systems, and Computers*, Pacific Grove, CA, Nov. 1-4, 2009.
Sarath, D., Nolan, K.E., Sutton, P.D., Doyle L.E. "Exploring the Reconfigurability Options of Multi-Carrier CDMA in Cognitive Radio Systems", Personal, Indoor and Mobile Radio Communications, 2007. PIMRC 2007. IEEE 18th International Symposium, Sep. 3-7, 2007.
Danijela Cabric, Shridhar Mubaraq Mishra, Robert W. Brodersen "Implementation Issues in Spectrum Sensing for Cognitive Radios" Signals, Systems and Computers, 2004. Conference Record of the Thirty-Eighth Asilomar Conference, Nov. 7-10, 2004.

(Continued)

*Primary Examiner* — Michael Neff
(74) *Attorney, Agent, or Firm* — Turk IP Law, LLC

(57) ABSTRACT

Technologies are generally described for cognitive radio spectrum sensing via Code Division Multiple Access (CDMA) receiver coding. A CDMA module in the front-end of a cognitive radio system may be used to sense spectrum. When the system is not decoding or transmitting signals, a modified CDMA receiver coding may replace a pseudorandom code used in decoding with relatively pure, non-random detection frequency to scan for energy from primary users of the spectrum. Multiplication of the received signal by spectrally pure codes in place of the CDMA code renders the CDMA processor effectively a scanning spectrum analyzer and may detect energy at multiple frequencies. The allocation of sub-bands and/or timing may be adjusted to account for the detected energy.

20 Claims, 8 Drawing Sheets

(56) References Cited

OTHER PUBLICATIONS

Lunden et al., Spectrum Sensing in Cognitive Radios Based on Multiple Cyclic Frequencies, 2—International Conference on Cognitive Radio Oriented Wireless Networks and Communications, Orlando, FL, USA, Aug. 1-3, 2007, pp. 37-43, [online], [retrieved on Apr. 8, 2011]. Retrieved from the Internet <URL : http://arxiv.org/PS_cache/arxiv/pdf/0707/0707.0909v1.pdf> Abstract Part I Introduction.

PCT/US11/23029 International Search Report and Written Opinion mailed May 12, 2011.

"Code division multiple access," last updated on Oct. 18, 2013, accessed at http://en.wikipedia.org/wiki/Code_division_multiple_access, accessed on Oct. 31, 2013, pp. 1-7.

* cited by examiner

US 8,761,290 B2

COGNITIVE RADIO SPECTRUM SENSING VIA CDMA RECEIVER CODING

CROSS REFERENCE TO RELATED APPLICATIONS

This application claims the benefit of International Patent Application Serial No. PCT/US11/23029 filed on Jan. 28, 2011. The disclosures of the International Patent Application are hereby incorporated by reference for all purposes.

BACKGROUND

Unless otherwise indicated herein, the materials described in this section are not prior art to the claims in this application and are not admitted to be prior art by inclusion in this section.

Emerging radio frequency communication standards expand capacity by defining secondary users. Primary users preemptively operate on defined bands and sub-bands according to present rules. Secondary users, in contrast, are allowed to use spectrum only after sensing that the spectrum is available in a process termed "cognitive radio." Cognitive radio devices need to be able to efficiently and quickly sense a given portion of the radio spectrum in order to determine which regions of the spectrum are available for use so as not to interfere with primary users.

Because cognitive radios are considered lower priority or secondary users of spectrum allocated to a primary user, a fundamental requirement is to avoid interference to potential primary users in their vicinity. On the other hand, primary user networks have no requirement to change their infrastructure for spectrum sharing with cognitive networks. Therefore, cognitive radios should be able to independently detect primary user presence through continuous spectrum sensing.

Code division multiple access (CDMA) is a channel access method used by various radio communication technologies. This concept in data communication is based on allowing several transmitters to send information simultaneously over a single communication channel. Several users are thus enabled to share a bandwidth of different frequencies referred to as multiplexing. CDMA may employ spread-spectrum technology and a special coding scheme, where each transmitter is assigned a code to allow multiple users to be multiplexed over the same physical channel. CDMA is a form of spread-spectrum signaling, since the modulated coded signal has a much higher data bandwidth than the data being communicated.

The present disclosure appreciates that there are several limitations with designing cognitive radio systems. For example, cognitive radio devices need to independently and rapidly detect primary user presence on a channel in order to use that channel. On the other hand, size and cost considerations are a significant aspect of electronic communication devices today. Devices such as wireless communication modules, portable computers, and comparable ones are progressively designed with smaller form factors and lower manufacturing costs. Thus, implementing cognitive radio in widely available consumer devices is a complex undertaking.

SUMMARY

The present disclosure generally describes techniques for cognitive radio spectrum sensing. In some examples, a method for cognitive radio spectrum sensing is described. An example method may include communicating with a radio frequency (RF) device by decoding a received RF signal employing a pseudorandom code during a communication session and scanning usage of a communication channel by replacing the pseudorandom code with a single frequency signal at a predefined frequency upon completion of the communication session.

In other examples, an apparatus for enabling cognitive radio spectrum sensing is described. The apparatus may include a radio module for wireless communications via radio frequency (RF) signals, a memory configured to store instructions, and a processor. The processor may be coupled to the memory, and may be adapted to execute the instructions, which when executed configure the processor to communicate with an RF device by causing the radio module to decode a received RF signal employing a pseudorandom code during a communication session and determine usage of a communication channel by causing the radio module to replace the pseudorandom code with a single frequency signal at a predefined frequency upon completion of the communication session.

In further examples, a computer-readable storage medium having instructions stored thereon for a method of cognitive radio spectrum sensing to be executed in a computing device with radio communication capability is described. The method may include communicating with a radio frequency (RF) device by decoding a received RF signal employing a pseudorandom code during a communication session and scanning usage of a communication channel by replacing the pseudorandom code with a single frequency signal at a predefined frequency upon completion of the communication session The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
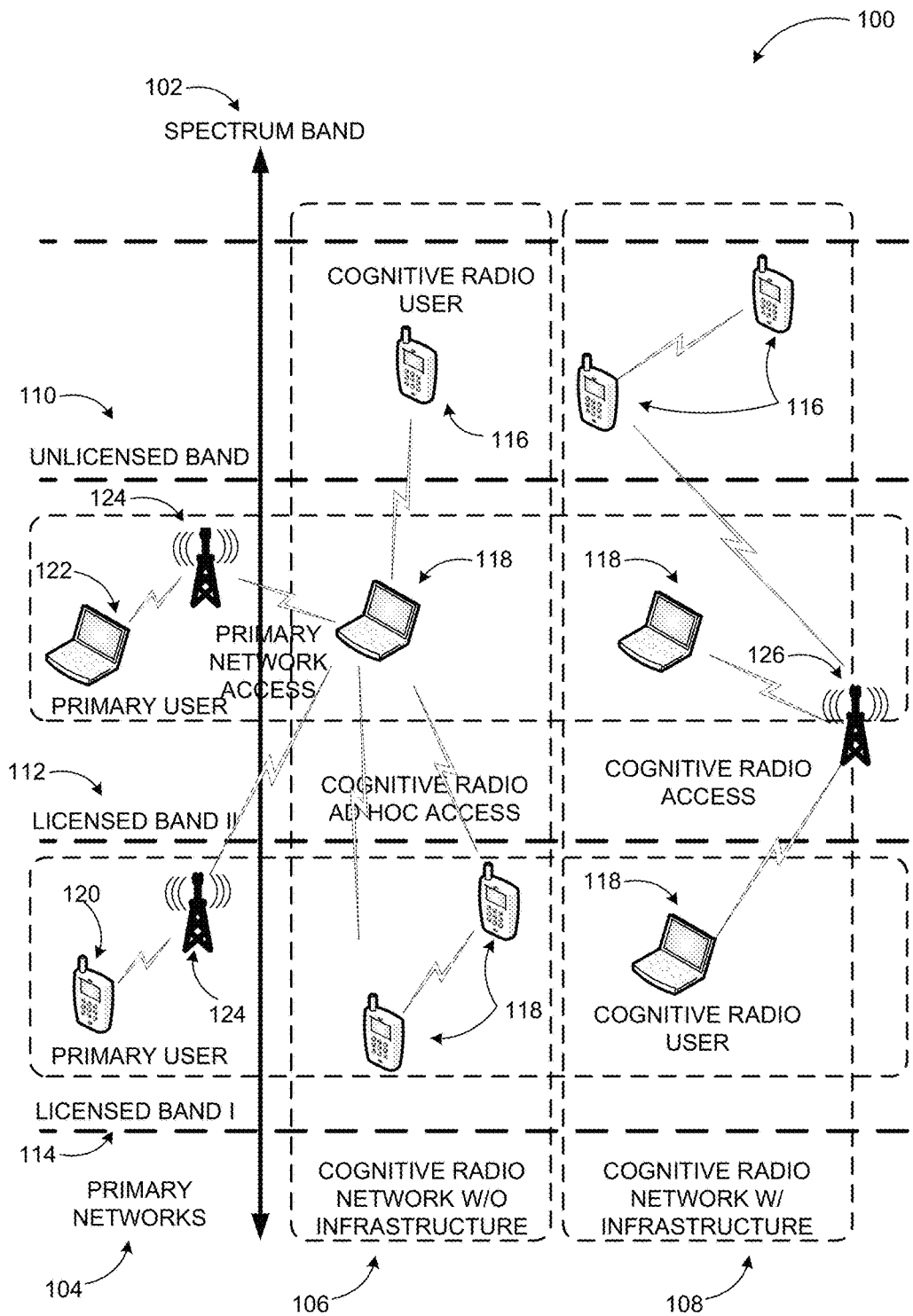
FIG. 1 illustrates a conceptual diagram of an example system of cognitive radio networks.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to cognitive radio spectrum sensing via Code Division Multiple Access (CDMA) receiver encoding.

Briefly stated, a CDMA module in the front-end of a cognitive radio system may be used to sense spectrum. When the system is not decoding or transmitting signals, a modified CDMA receiver coding may replace a pseudorandom code used in decoding with relatively pure, non-random detection frequency to scan for energy from primary users of the spectrum. Multiplication of the received signal by spectrally pure codes in place of the CDMA code renders the CDMA processor effectively a scanning spectrum analyzer and may detect energy at multiple frequencies. The allocation of subbands and/or timing may be adjusted to account for the detected energy.

FIG. 1 illustrates a conceptual diagram of an example system of cognitive radio networks in accordance with at least some embodiments described herein. Spectrum congestion is a fundamental consequence of the current model of exclusive licensing wireless spectra. In this model, regulatory agencies of different countries or international agencies assign specific bands to designated uses. As illustrated in diagram 100, portions of the spectrum band 102 may be designated a licensed bands (112, 114) or unlicensed band 110. In licensed bands (112, 114), the use of the band is restricted to licensed users such as cellular bands licensed to cellular service providers or radio/TV bands assigned to radio/TV broadcasters. Unlicensed band 110 may be set aside for typically lower power users without formal licensing. Examples of unlicensed band 110 include ISR bands (e.g. 2.4 GHz, 5.8 GHz) for industrial, scientific, and research equipment which can communicate wirelessly without receiving a license from a regulatory authority.

The designated users of licensed and unlicensed bands may be referred to as primary networks 104. Such networks may have an infrastructure (108) or not (106). Primary users 120 or 122 of licensed bands may communicate with other primary users through base stations 124 in a configuration with infrastructure or through ad hoc networks. With the rapid development of computing technologies and participation in every aspect of daily life from business to science, from personal to institutional uses, the need for wider variety of communication networks and broader bandwidths is increasing as well. Even with more efficient use of existing licensed and unlicensed bands, the need for additional bandwidth far exceeds the available bandwidth. Thus, shared use of existing bands becomes a potential solution. The concern with shared use of licensed and unlicensed bands is, however, interference, which may harm existing primary users of those bands.

One solution to enabling sharing of existing spectrum bands without harmful interference is use of cognitive radio technology. In cognitive radio networks without infrastructure (106), secondary users 116, 118 can communicate with each other through ad hoc access by first determining that a channel is currently not in use by a primary user, then using that channel to communicate until a primary user begins to use the channel. In cognitive radio networks with infrastructure (108), the communication between the secondary users 116, 118 may be facilitated through one or more base stations 126. Since cognitive radios are considered lower priority or secondary users of spectrum allocated to a primary user, they need to be able to independently detect primary user presence through continuous spectrum sensing.

Embodiments are directed to employing CDMA technology in combination with cognitive radio technology to detect wireless channels that are free from use by primary users (or other users). Wireless channel congestion may be reduced by cognitive radios that can adapt to use wireless channels that are not being utilized locally. According to some example embodiments, a CDMA module of a cognitive radio system may be used to sense spectrum. When the system is not decoding or transmitting signals, a modified CDMA receiver coding may replace a pseudorandom code used in decoding with relatively pure, non-random detection frequency to scan for energy from primary users of the spectrum. Processing of the received signal with spectrally pure codes instead of the CDMA code turns the CDMA processor effectively into a scanning spectrum analyzer and enables detection of energy at multiple frequencies.

Figure 2:
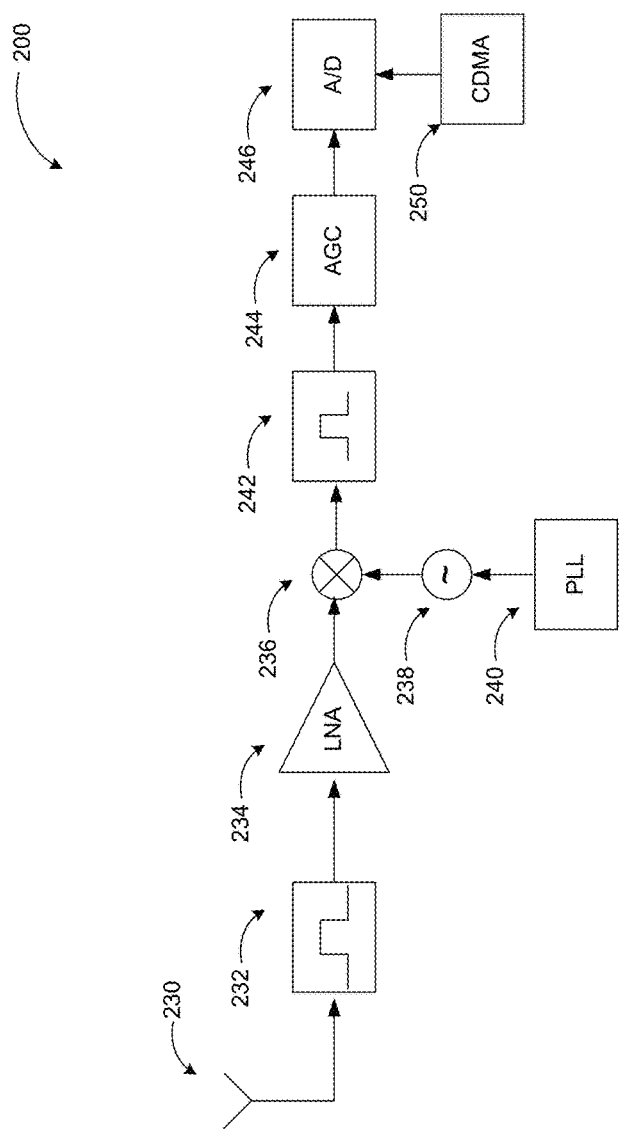
FIG. 2 illustrates a block diagram of an example front end for a radio employing a Code Division Multiple Access (CDMA) module for spectrum sensing.

FIG. 2 illustrates a block diagram of an example front end for a radio employing a CDMA module for spectrum sensing. Demodulation using pseudorandom code in a CDMA system is typically accomplished through a multiplication. Outgoing data is multiplied (XOR) with the pseudorandom code to modulate it and received signals are multiplied with the pseudorandom code to extract the data. A cognitive radio device according to some embodiments employs this multiplication along with replacement of the pseudorandom code with spectral components, such that the CDMA module of the radio front end is effectively turned into a spectrum analyzer for detecting signals in each spectral slice.

The cognitive radio front end illustrated in diagram 200 includes an antenna 230, a Radio Frequency (RF) filter 232, a low-noise amplifier (LNA) 234, and a wideband tunable local oscillator (LO) 238, which may be controlled by a PLL module 240 and an output of the LO 238 multiplied (236) with the filtered/amplified signal to reduce its frequency from the RF band to a lower frequency (baseband). The radio may also include a baseband filter 242 and an automatic gain control module 244 optionally. The processed baseband signal may be provided to an analog-to-digital (A/D) converter 246, which in conjunction with a CDMA module 250 may replace a pseudorandom code used in decoding the signal with relatively pure, non-random detection frequency when the system is not decoding or transmitting signals. Processing of the received signal with spectrally pure codes instead of the CDMA code enables the radio to scan for energy from primary users of the spectrum using the CDMA module 250 effectively as a scanning spectrum analyzer.

Generally, a cognitive radio front end system according to embodiments may operate in a similar manner to other cognitive radio front ends, yet the present disclosure provides CDMA module 250 instead of a tunable notch filter that is typically positioned between the LNA 234 and wideband tunable LO 238. The CDMA module 250 may include CDMA receiver coding that is normally used to receive CDMA signals and enable the radio to scan for energy from other wireless devices when a received signal is not being decoded or a signal encoded for transmission. For example, the radio of diagram 200 may determine which communication frequencies are being used by other wireless devices in the area, and accordingly select free or unused frequencies to be used in communication with other devices as a secondary user of a band.

Figure 3:
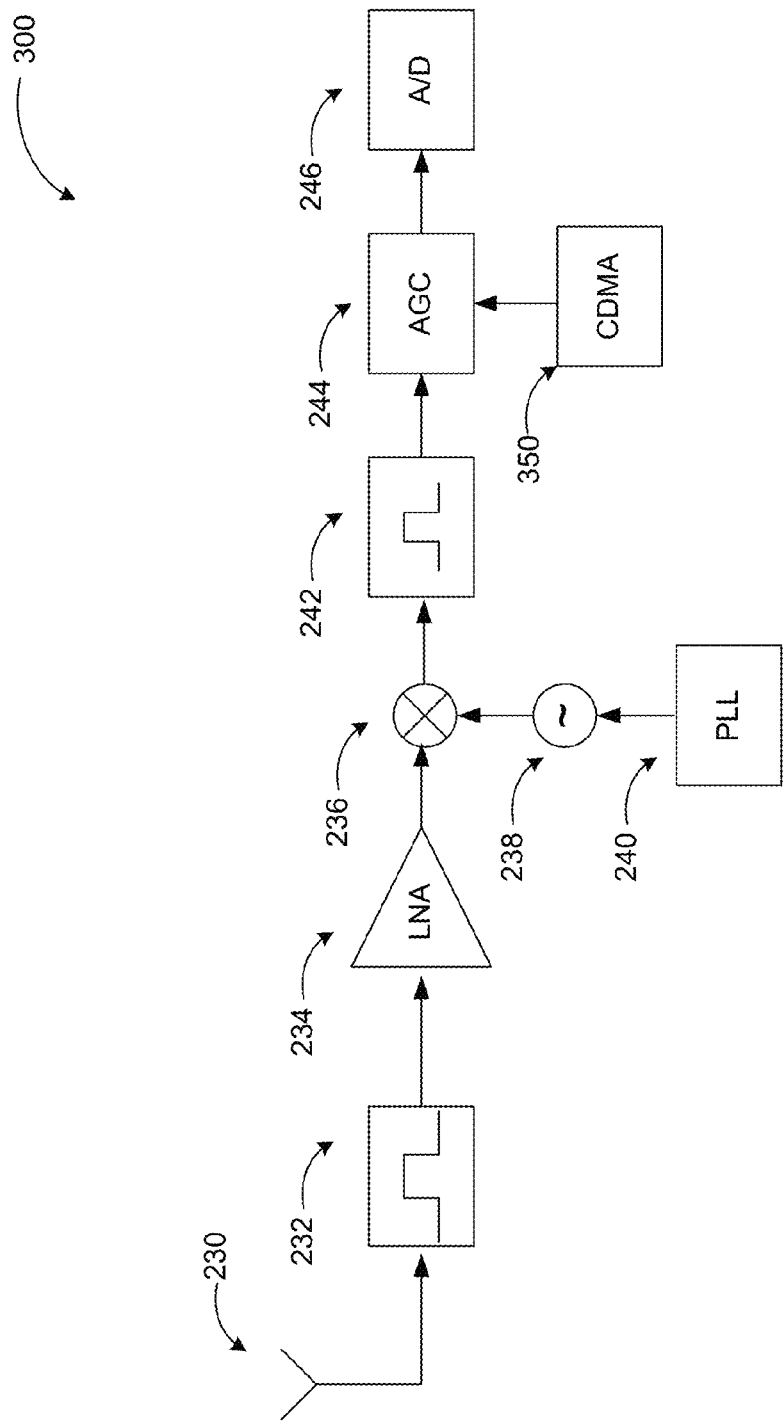
FIG. 3 illustrates a block diagram of another example front end for a cognitive radio employing a CDMA module for spectrum sensing.

FIG. 3 illustrates a block diagram of another example front end for a cognitive radio employing a CDMA module for spectrum sensing in accordance with at least some embodiments described herein. The components of the radio front end illustrated in diagram 300 are mostly the same as those in diagram 200 of FIG. 2. Differently from FIG. 2, CDMA module 350 is positioned before the ND converter 246 in diagram 300, however. Indeed, in a cognitive radio according to embodiments, the CDMA module 350 may be located in any desired or operable location within the front end system.

Furthermore, spectrum sensing via CDMA receiver coding may be accomplished through hardware and/or software components. Additionally, the CDMA receiver coding based energy scanning may be used in analog or digital radio systems. Because a cognitive radio system according to embodiments replaces the typically expensive tunable notch component of conventional cognitive radio front ends, cost savings and ease of manufacturing may be achieved.

Figure 4:
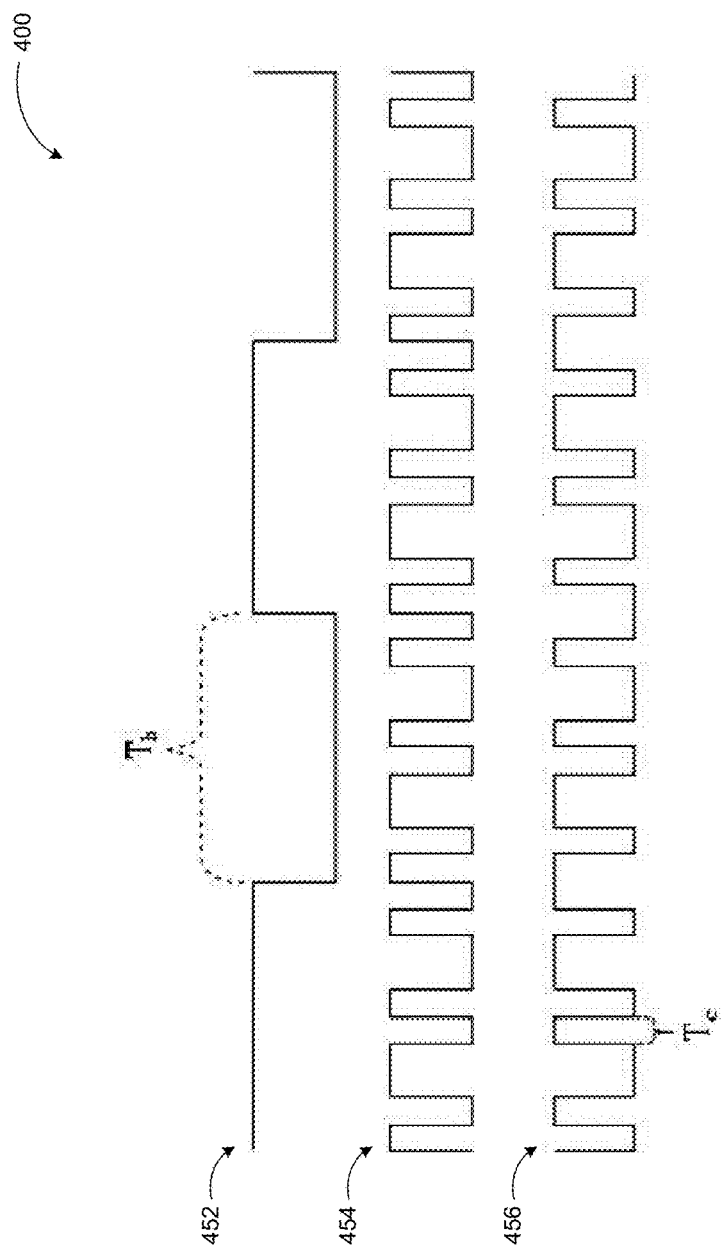
FIG. 4 illustrates example signals involved in CDMA coding.

FIG. 4 illustrates example signals involved in CDMA coding in a system according to at least some embodiments. CDMA is a spread spectrum multiple access technique. A spread spectrum technique spreads the bandwidth of the data uniformly for the same transmitted power. Spreading code is a pseudorandom code that has a narrow ambiguity function, unlike other narrow pulse codes. In CDMA a locally generated code may run at a relatively higher rate than the data to be transmitted. Data for transmission may be combined via bitwise XOR (exclusive OR) with the faster code. Diagram 400 shows how spread spectrum signal is generated.

The data signal 452 with pulse duration of Tb may be XOR'ed with the code signal 454 with pulse duration of Tc. It should be noted that bandwidth is proportional to 1/T where T is the bit time. Therefore, the bandwidth of the data signal is 1/Tb and the bandwidth of the spread spectrum signal 456 is 1/Tc. Since Tc is typically much smaller than Tb, the bandwidth of the spread spectrum signal 456 may be relatively larger than the bandwidth of the original data signal 452. The ratio Tb/Tc is called spreading factor or processing gain and determines to a certain extent the upper limit of the total number of users supported simultaneously by a base station.

Each user in a CDMA system may employ a different code to modulate their signal. Selecting the codes used to modulate the data signal 452 is a significant consideration in the performance of CDMA systems. Optimum performance may occur when there is proper separation between the signal of a desired user and the signals of other users. The separation of the signals may be accomplished by correlating the received signal with a locally generated code of the desired user. If the signal matches the desired user's code then the correlation function may be high and the system can extract that signal. If the desired user's code has nothing in common with the signal the correlation may be close to zero (thus eliminating the signal). This is referred to as cross-correlation. If the code is correlated with the signal at any time offset other than zero, the correlation may be close to zero. This is referred to as auto-correlation and may be used to reject multi-path interference.

While embodiments have been discussed above using specific examples, components, scenarios, and configurations in FIG. 1 through FIG. 4, they are intended to provide a general guideline to be used for cognitive radio spectrum sensing via CDMA receiver coding. These examples do not constitute a limitation on the embodiments, which may be implements using other components, maximization schemes, and configurations using the principles described herein. For example, other algorithms may be implemented than those provided as example for detecting energy and switching channels, and the like.

Figure 5:
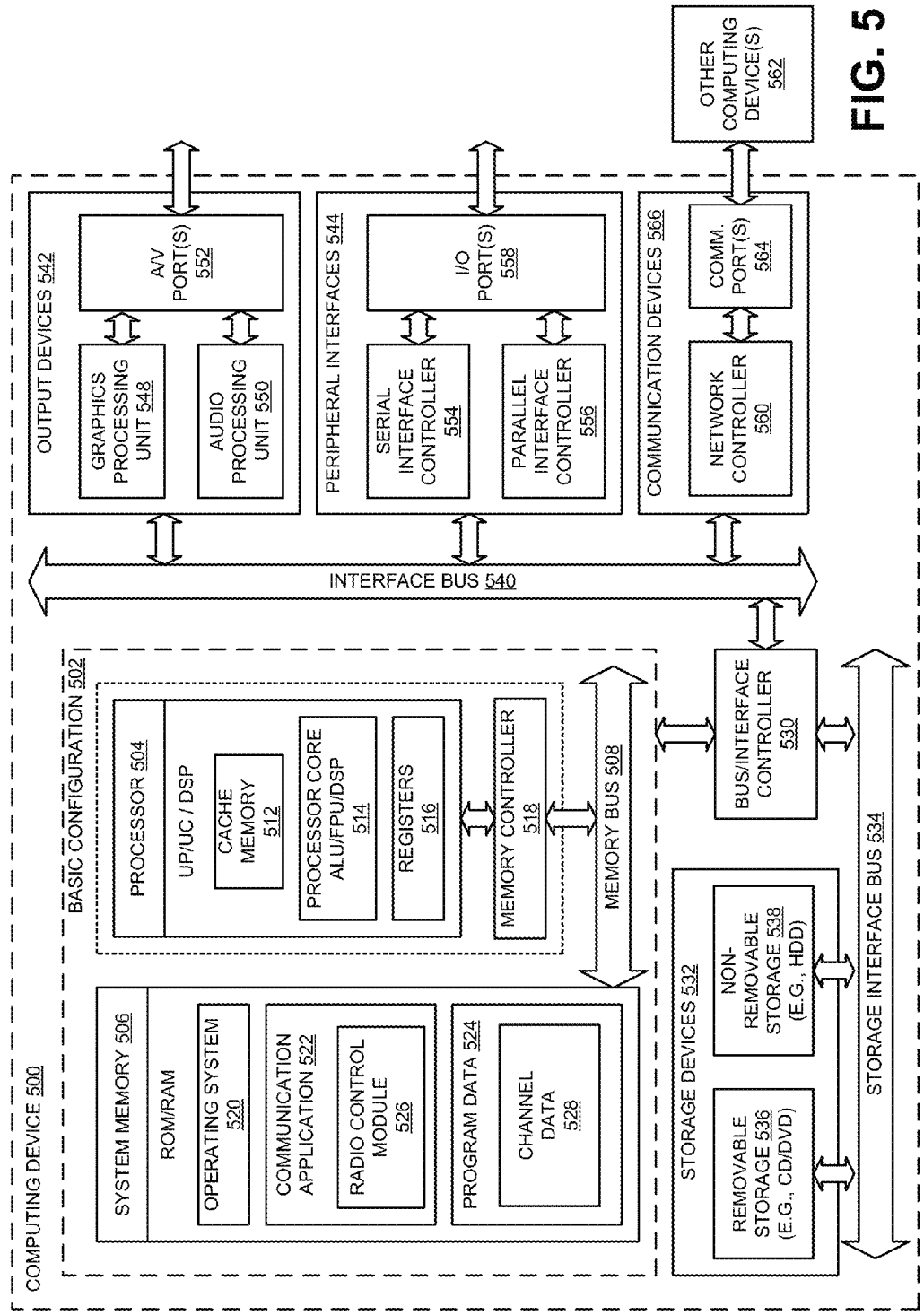
FIG. 5 illustrates a general purpose computing device, which may be used to implement cognitive radio spectrum sensing employing CDMA receiver coding.

FIG. 5 illustrates a general purpose computing device, which may be used to implement cognitive radio spectrum sensing employing CDMA receiver coding in accordance with at least some embodiments described herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one more levels of caching, such as a level cache memory 512, a processor core 514, and registers 516. Example processor core 514 may include an arithmetic logic unit (ALU), a floating point unit (FPU), a digital signal processing core (DSP Core), or any combination thereof. An example memory controller 518 may also be used with processor 504, or in some implementations memory controller 515 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more communication applications 522, and program data 524. Communication application 522 may include a radio control module 526 that is arranged to control a cognitive radio and sense spectrum using CDMA receiver coding and any other processes, methods and functions as discussed above. Program data 524 may include one or more of channel data 528 (e.g. frequencies of available channels, etc.) and similar data as discussed above in conjunction with at least FIG. 1 through 4. This data may be useful for switching channels upon detecting an available or busy channel as is described herein. In some embodiments, communication application 522 may be arranged to operate with program data 524 on operating system 520 such that cognitive radio spectrum is sensed as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 566 to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a physical server, virtual server, a computing cloud, or a hybrid device that include any of the above functions. Computing device 500 may also be implemented as a personal computer including both laptop computer and non-laptop computer configurations. Moreover computing device 500 may be implemented as a networked system or as part of a general purpose or specialized server.

Networks for a networked system including computing device 500 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 6:
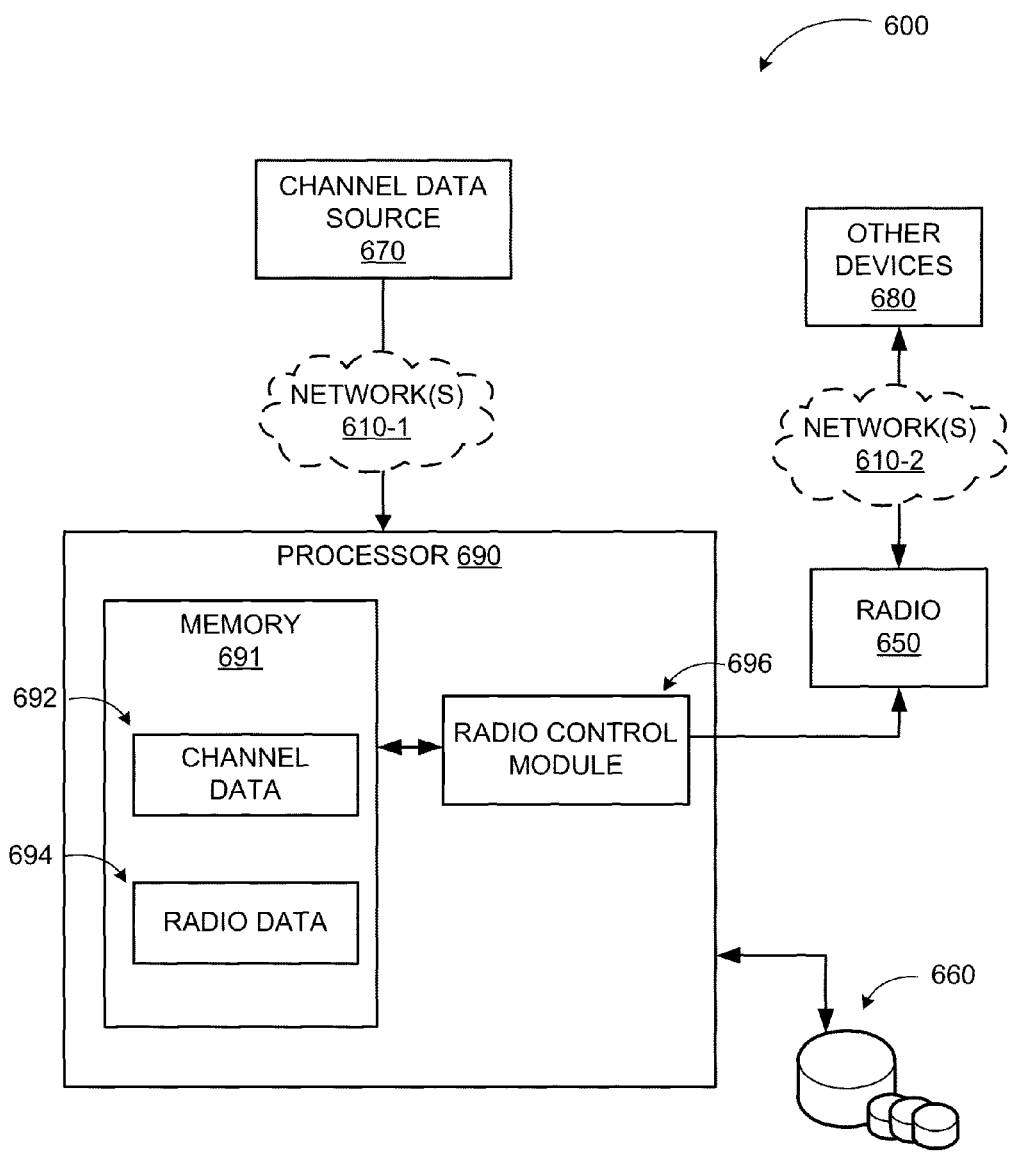
FIG. 6 illustrates a special purpose processor, which may be used to implement cognitive radio spectrum sensing employing CDMA receiver coding.

FIG. 6 illustrates a special purpose processor, which may be used to implement cognitive radio spectrum sensing employing CDMA receiver coding according to at least embodiments described herein. Processor 690 in diagram 600 may be part of a computing device that is communicatively coupled to radio 650, which may facilitate communication with other wireless devices 680 through network(s) 610-2 or may be integrated into radio 650. Processor 690 may also communicate with data source 670 storing channel information via network(s) 610-1.

Processor 690 may include a number of processing modules such as radio control module 696. Channel data 692 retrieved from channel data source 670 via network(s) 610-1 may be provided to radio control module 696 for determining a channel to scan or to switch to. Radio data 694 may include information associated with operational controls of the radio 650. Channel data 692 and radio data 694 may be stored during processing in memory 691, which may be a cache memory of the processor 690 or in an external memory (e.g., memory external to processor 690). Processor 690 may also be communicatively coupled to data stores 660, where at least some of the data may be stored during or following the control of radio 650.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
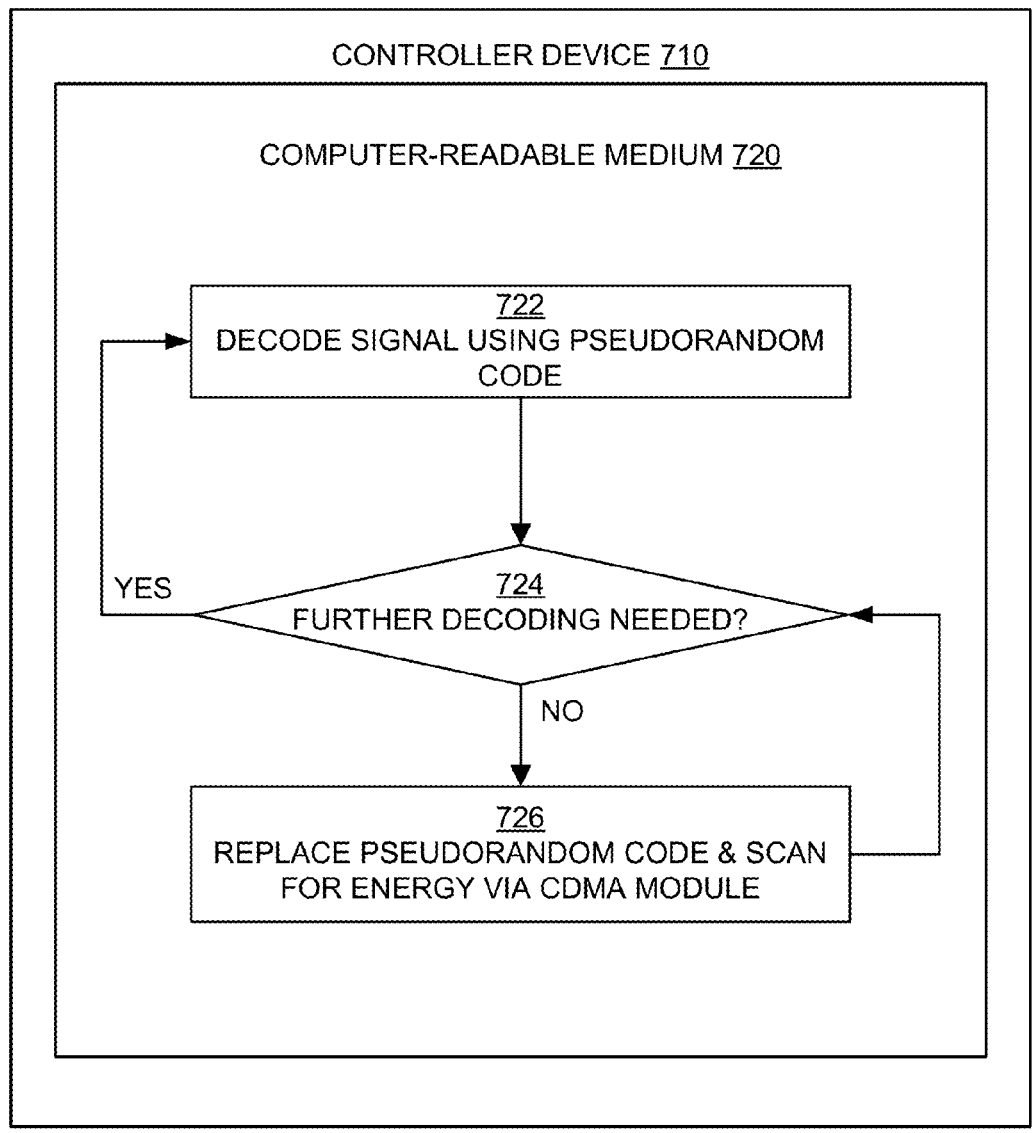
FIG. 7 is a flow diagram illustrating an example method for employing CDMA receiver coding for cognitive radio spectrum sensing that may be performed by a computing device such as device 500 in FIG. 5 or a special purpose processor such as processor 690 of FIG. 6.

FIG. 7 is a flow diagram illustrating an example method for employing CDMA receiver coding for cognitive radio spectrum sensing that may be performed by a computing device such as device 500 in FIG. 5 or a special purpose processor such as processor 690 of FIG. 6. Thus, controller device 710 may be embodied as computing device 500, special purpose processor 690, or similar devices executing instructions stored in computer-readable medium 720 for performing the method. A process of spectrum sensing via CDMA receiver coding in cognitive radio systems may include one or more operations, functions or actions as is illustrated by one or more of blocks 722, 724, and/or 726.

Some example processes may begin with operation 722, "DECODE SIGNAL USING PSEUDORANDOM CODE". At operation 722, a received signal may be decoded using a pseudorandom code. It should be noted that this is not a security code, but the C (code) in CDMA and is part of signal translation. The operation may be performed by the CDMA module 350 of FIG. 3 or similar component.

Operation 722 may be followed by decision operation 724, "FURTHER DECODING NEEDED?" At decision operation 724, the processor (e.g. processor 690) may make a determination whether further signal decoding is required. If further signal decoding is needed, the process may return to operation 722 and continue decoding the received signal. However, if signal decoding is not needed, the CDMA module 350 may replace the pseudorandom code with a modulated spectrally pure code so that energy scanning may be performed at operation 726 "REPLACE PSEUDORANDOM CODE & SCAN FOR ENERGY VIA CDMA MODULE."

The scanning may occur until further signal decoding is needed, and the process then cycled back to operation 722. For example, when a system is not decoding a signal, (e.g. between beacons), the CDMA module 350, can scan for energy from primary users using various spectrally pure test frequencies. Because the pseudorandom code is not required when the system is not decoding a signal, a spectrally pure code may instead be utilized for spectrum sensing. According to some embodiments, a series of spectrally pure frequencies may be generated in a "chirp" to scan a group of closely related frequencies. A chirp is a signal in which the frequency increases ('up-chirp') or decreases ('down-chirp') with time.

A unique pseudorandom code between communicating devices allows a transmitted data signal that corresponds to the pseudorandom code to be identified by the receiving device, even if several transmitters are sending data over the same communication channel. Data signals not correlating to the pseudorandom code are effectively undetected. However, by replacing the PC with a spectrally pure test frequency, communications over the channel at a given frequency can be detected, even if such communications cannot be decoded. The cognitive radio system can therefore determine if any wireless communications are occurring on a given frequency, and by changing the test frequency, the system can determine if wireless communications are occurring on a range of frequencies. By detecting whether wireless communications are occurring on various frequencies, the system can select wireless communication channels that are not being used by primary users or other users, and then selectively use these free communication channels.

The operations included in the process of FIG. 7 described above are for illustration purposes. Cognitive radio spectrum sensing via CDMA receiver coding may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 8:
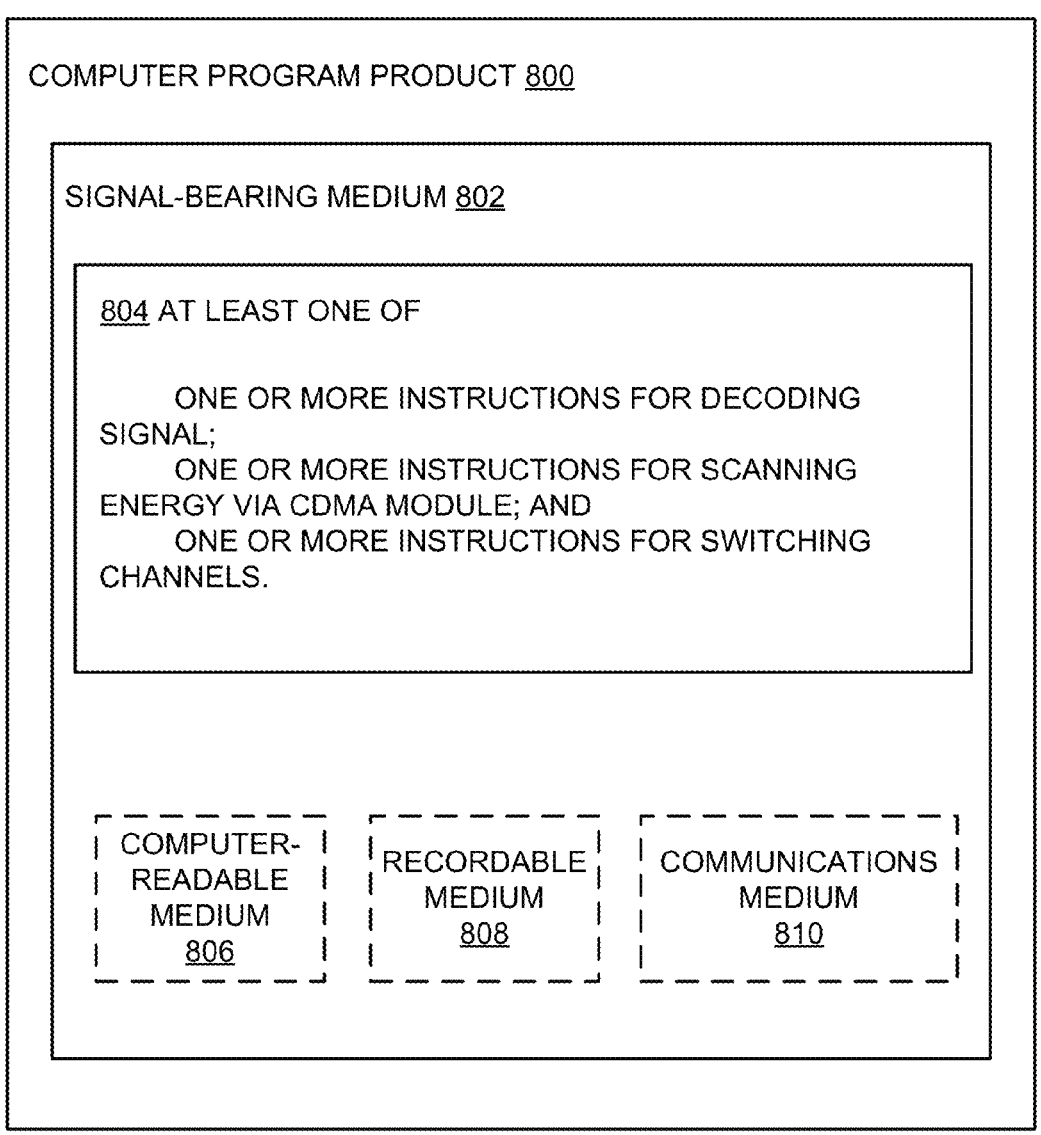
FIG. 8 illustrates a block diagram of an example computer program product, all arranged in accordance with at least some embodiments described herein.

FIG. 8 illustrates a block diagram of an example computer program product, arranged in accordance with at least some embodiments described herein. In some examples, as shown in FIG. 8, computer program product 800 may include a signal bearing medium 802 that may also include machine readable instructions 804 that, when executed by, for example, a processor, may provide the functionality described above with respect to FIG. 1 through FIG. 4. Thus, for example, referring to processor 690, one or more of the tasks shown in FIG. 8 may be undertaken in response to instructions 804 conveyed to the processor 690 by medium 802 to perform actions associated with cognitive radio spectrum sensing via CDMA receiver coding as described herein. Some of those instructions may include decoding a signal, scanning energy via a CDMA module, and switching channels through one or more algorithms as described previously.

In some implementations, signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, computer program product 800 may be conveyed to the processor 804 by an RF signal bearing medium 802, where the signal bearing medium 802 is conveyed by a wireless communications medium 810 (e.g., a wireless communications medium conforming with the IEEE 802.11 standard).

In some examples, the present disclosure describes a method for cognitive radio spectrum sensing. The method may include communicating with a radio frequency (RF) device by decoding a received RF signal employing a pseudorandom code during a communication session 722 and scanning usage of a communication channel by replacing the pseudorandom code with a single frequency signal at a predefined frequency 726 upon completion of the communication session.

According to some examples, the method may also include scanning a plurality of communication channels by modifying the predefined frequency 726 and initiating another communication session upon determining an available communication channel. The method may further include scanning the plurality of communication channels by employing a group of adjacent frequencies in a "chirp" signal and deriving a base band signal from the received RF signal (236). Decoding the received RF signal may include multiplying the base band signal with the pseudorandom code 454. Scanning the communication channel may include multiplying the base band signal 452 with the single frequency signal.

According to other examples, the method may include multiplying the base band signal 452 with the single frequency signal prior to one of: filtering the base band signal (242), applying automatic gain control to the base band signal (244), or converting the base band signal to a digital signal (246). The pseudorandom code and the single frequency signal may be generated at a Code Division Multiple Access (CDMA) module 250. The method may also include selecting the predefined frequency based on a level of energy detected at the communication channel. The method may yet further include scanning a plurality of communication channels by employing a plurality of frequencies, wherein a number and a timing of the plurality of frequencies is determined based on a level of energy detected at a first scanned communication channel.

In other examples, the present disclosure describes an apparatus for enabling cognitive radio spectrum sensing. The apparatus may include a radio module 650 for wireless communications via radio frequency (RF) signals, a memory 691 configured to store instructions, and a processor. The processor 690 may be coupled to the memory, and may be adapted to execute the instructions, which when executed configure the processor to communicate with an RF device by causing the radio module to decode a received RF signal employing a pseudorandom code during a communication session 722 and determine usage of a communication channel by causing the radio module to replace the pseudorandom code with a single frequency signal at a predefined frequency 726 upon completion of the communication session.

According to some examples, the processor 690 may cause the radio module 650 to scan a plurality of communication channels by modifying the predefined frequency and cause the radio module 650 to initiate another communication session upon determining an available communication channel (724). The processor may also cause the radio module 650 to scan the plurality of communication channels by employing a group of adjacent frequencies in a "chirp" signal and cause the radio module 650 to derive a base band signal from the received RF signal (236).

According to other examples, the processor may cause the radio module 650 to multiply the base band signal with the single frequency signal in order to scan the communication channel. The apparatus may further comprise a Code Division Multiple Access (CDMA) module 250 configured to generate the pseudorandom code and the single frequency signal. The CDMA module 250 may be positioned prior to one of: a base band filtering module 240, an automatic gain control module 244, and an analog-to-digital converter module 246. The radio module 650 may further include at least one of: a pre-filter module 232, a low noise amplifier module 234, and/or a down-conversion module 236.

In further examples, the present disclosure describes a computer-readable storage medium 802 having instructions stored thereon for a method of cognitive radio spectrum sensing to be executed in a computing device 118 with radio communication capability. The method may include communicating with a radio frequency (RF) device by decoding a received RF signal employing a pseudorandom code during a communication session 722 and scanning usage of a communication channel by replacing the pseudorandom code with a single frequency signal at a predefined frequency 726 upon completion of the communication session.

According to some examples, the method described by the instructions may further include scanning a plurality of communication channels by modifying the predefined frequency 726 and initiating another communication session upon determining 724 an available communication channel. The method may also include scanning the plurality of communication channels by employing a group of adjacent frequencies in a "chirp" signal and deriving a base band signal from the received RF signal (236). Decoding the received RF signal may include multiplying the base band signal with the pseudorandom code 454. Scanning the communication channel may include multiplying the base band signal 452 with the single frequency signal.

According to further examples, the method may include multiplying the base band signal 452 with the single frequency signal prior to one of: filtering the base band signal (242), applying automatic gain control to the base band signal (244), or converting the base band signal to a digital signal (246). The pseudorandom code and the single frequency signal may be generated at a Code Division Multiple Access (CDMA) module 250. The method may further include selecting the predefined frequency based on a level of energy detected at the communication channel. The method may yet further include scanning a plurality of communication channels by employing a plurality of frequencies, wherein a number and a timing of the plurality of frequencies is determined based on a level of energy detected at a first scanned communication channel.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for cognitive radio spectrum sensing, the method comprising:
communicating with a radio frequency (RF) device by decoding a received RF signal employing a pseudorandom code during a communication session; and
upon completion of the communication session, scanning usage of a communication channel by replacing the pseudorandom code with a single frequency signal at a predefined frequency.

2. The method according to claim 1, further comprising:
scanning a plurality of communication channels by modifying the predefined frequency and employing a group of adjacent frequencies in a "chirp" signal.

3. The method according to claim 1, further comprising:
deriving a base band signal from the received RF signal.

4. The method according to claim 3, wherein scanning the communication channel includes multiplying the base band signal with the single frequency signal prior to one of: filtering the base band signal, applying automatic gain control to the base band signal, or converting the base band signal to a digital signal.

5. The method according to claim 1, wherein the pseudorandom code and the single frequency signal are generated at a Code Division Multiple Access (CDMA) module.

6. The method according to claim 1, further comprising:
selecting the predefined frequency based on a level of energy detected at the communication channel.

7. The method according to claim 1, further comprising:
scanning a plurality of communication channels by employing a plurality of frequencies, wherein a number and a timing of the plurality of frequencies is determined based on a level of energy detected at a first scanned communication channel.

8. An apparatus for enabling cognitive radio spectrum sensing, comprising:
a radio module for wireless communications via radio frequency (RF) signals;
a memory configured to store instructions;
a processor coupled to the memory, wherein the processor is adapted to execute the instructions, which when executed configure the processor to:
communicate with an RF device by causing the radio module to decode a received RF signal employing a pseudorandom code during a communication session; and
upon completion of the communication session, determine usage of a communication channel by causing the radio module to replace the pseudorandom code with a single frequency signal at a predefined frequency.

9. The apparatus according to claim 8, wherein the processor is further configured to:
cause the radio module to scan a plurality of communication channels by modifying the predefined frequency and employing a group of adjacent frequencies in a "chirp" signal.

10. The apparatus according to claim 8, wherein the processor is further configured to:
cause the radio module to derive a base band signal from the received RF signal and multiply the base band signal with the single frequency signal in order to scan the communication channel.

11. The apparatus according to claim 8, further comprising a Code Division Multiple Access (CDMA) module configured to generate the pseudorandom code and the single frequency signal prior to one of: a base band filtering module, an automatic gain control module, and an analog-to-digital converter module.

12. The apparatus according to claim 8, wherein the radio module further comprises at least one of: a pre-filter module, a low noise amplifier module, and/or a down-conversion module.

13. A non-transitory computer-readable storage medium having instructions stored thereon for a method of cognitive radio spectrum sensing to be executed in a computing device with radio communication capability, the method comprising:
communicating with a radio frequency (RF) device by decoding a received RF signal employing a pseudorandom code during a communication session; and
upon completion of the communication session, scanning usage of a communication channel by replacing the pseudorandom code with a single frequency signal at a predefined frequency.

14. The non-transitory computer-readable storage medium according to claim 13, wherein the method further comprises:
scanning a plurality of communication channels by modifying the predefined frequency and employing a group of adjacent frequencies in a "chirp" signal.

15. The non-transitory computer-readable storage medium according to claim 13, wherein the method further comprises:
deriving a base band signal from the received RF signal.

16. The non-transitory computer-readable storage medium according to claim 15, wherein decoding the received RF signal includes multiplying the base band signal with the pseudorandom code.

17. The non-transitory computer-readable storage medium according to claim 15, wherein scanning the communication channel includes multiplying the base band signal with the single frequency signal prior to one of: filtering the base band signal, applying automatic gain control to the base band signal, or converting the base band signal to a digital signal.

18. The non-transitory computer-readable storage medium according to claim 13, wherein the pseudorandom code and the single frequency signal are generated at a Code Division Multiple Access (CDMA) module.

19. The non-transitory computer-readable storage medium according to claim 13, wherein the method further comprises:
selecting the predefined frequency based on a level of energy detected at the communication channel.

20. The non-transitory computer-readable storage medium according to claim 13, wherein the method further comprises:
scanning a plurality of communication channels by employing a plurality of frequencies, wherein a number and a timing of the plurality of frequencies is determined based on a level of energy detected at a first scanned communication channel.

* * * * *

UNITED STATES PATENT AND TRADEMARK OFFICE
CERTIFICATE OF CORRECTION

PATENT NO. : 8,761,290 B2  
APPLICATION NO. : 13/133942  
DATED : June 24, 2014  
INVENTOR(S) : Ezekiel Kruglick Page 1 of 1

It is certified that error appears in the above-identified patent and that said Letters Patent is hereby corrected as shown below:

On the Title Page

Assignee should not have a "," between "Development" and "LLC" and should read:

Empire Technology Development LLC

Signed and Sealed this
Second Day of September, 2014

Michelle K. Lee
*Deputy Director of the United States Patent and Trademark Office*